United States Patent
Sakai

(10) Patent No.: US 12,487,092 B2
(45) Date of Patent: Dec. 2, 2025

(54) TRAVEL ROUTE GUIDANCE DEVICE AND TRAVEL ROUTE GUIDANCE METHOD

(71) Applicant: TOYOTA JIDOSHA KABUSHIKI KAISHA, Toyota (JP)

(72) Inventor: Kazunori Sakai, Nissin (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 127 days.

(21) Appl. No.: 18/295,025

(22) Filed: Apr. 3, 2023

(65) Prior Publication Data

US 2024/0003696 A1 Jan. 4, 2024

(30) Foreign Application Priority Data

Jul. 1, 2022 (JP) ................................ 2022-106967

(51) Int. Cl.
*G01C 21/34* (2006.01)

(52) U.S. Cl.
CPC ..... *G01C 21/3461* (2013.01); *G01C 21/3492* (2013.01)

(58) Field of Classification Search
CPC ................. G01C 211/3461; G01C 211/3492
See application file for complete search history.

(56) References Cited

U.S. PATENT DOCUMENTS

| 2007/0021909 | A1 | 1/2007 | Matsuda |
| 2015/0066270 | A1 | 3/2015 | Ogawa |
| 2015/0338226 | A1* | 11/2015 | Mason ............. G08G 1/096816 |
| | | | 701/408 |
| 2017/0372608 | A1* | 12/2017 | Sugimoto ............ G08G 1/0145 |

FOREIGN PATENT DOCUMENTS

| JP | 2006-004270 A | 1/2006 |
| JP | 2007-024833 A | 2/2007 |
| JP | 2020-102822 A | 7/2020 |
| JP | 2020-118547 A | 8/2020 |
| JP | 2021-135757 A | 9/2021 |
| WO | 2013/132593 A1 | 9/2013 |

* cited by examiner

*Primary Examiner* — Adnan M Mirza
(74) *Attorney, Agent, or Firm* — Oliff PLC

(57) ABSTRACT

The traveling route guidance device includes a route acquisition unit that acquires a plurality of traveling routes from a current position of the vehicle to a destination, a gradient distribution acquisition unit that acquires a distribution of a gradient of each road surface of the plurality of traveling routes, a vehicle speed acquisition unit that acquires a vehicle speed of another vehicle traveling on each of the plurality of traveling routes, a load estimation unit that estimates a load of the vehicle when traveling on the traveling route based on the distribution of the gradient for each traveling route and the vehicle speed, and a notification unit that notifies the plurality of traveling routes and the load to an occupant of the vehicle.

11 Claims, 12 Drawing Sheets

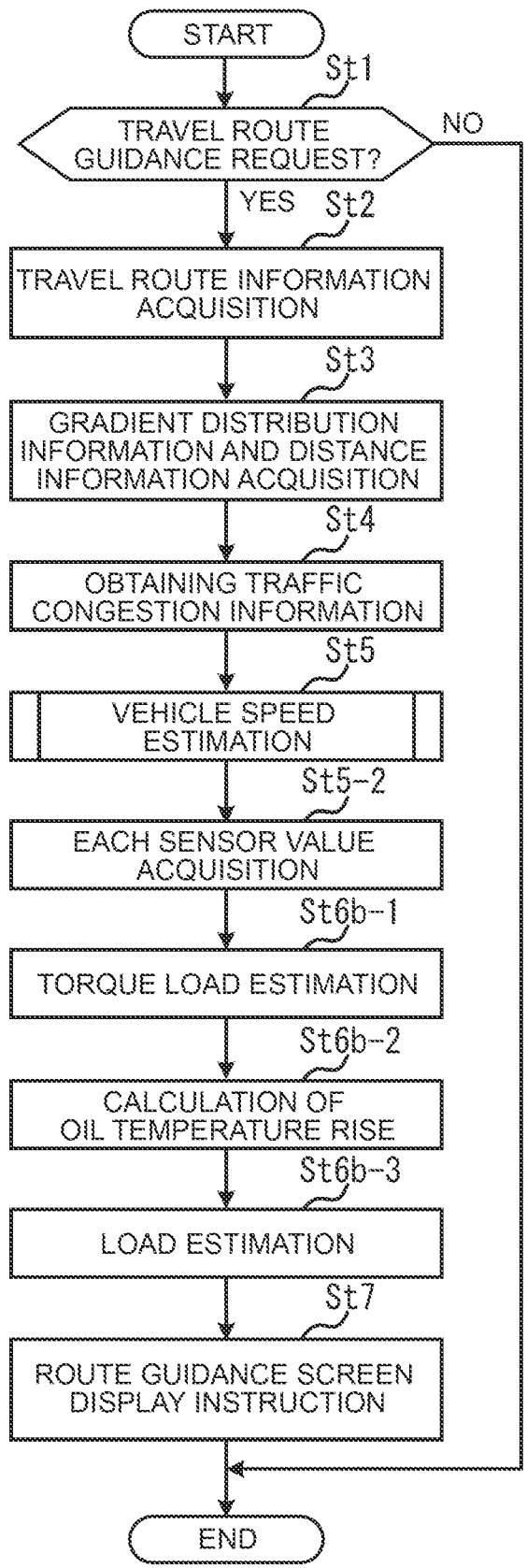

TRAVEL ROUTE GUIDANCE DEVICE AND TRAVEL ROUTE GUIDANCE METHOD

CROSS-REFERENCE TO RELATED APPLICATION

This application claims priority to Japanese Patent Application No. 2022-106967 filed on Jul. 1, 2022, incorporated herein by reference in its entirety.

BACKGROUND

1. Technical Field

The present disclosure relates to a travel route guidance device and a travel route guidance method.

2. Description of Related Art

For example, Japanese Unexamined Patent Application Publication No. 2021-135757 (JP 2021-135757 A) describes that, in a billing amount management device of a car sharing system, based on the respective distances of a mountainous area, an urban area, and a highway on a plurality of candidate routes of a vehicle, a cumulative load during traveling of the vehicle is calculated for each candidate route, and an additional billing amount corresponding to a load is presented together with the candidate route.

SUMMARY

For example, in order to reduce the maintenance cost of a vehicle, a vehicle dispatch service and a taxi operating company are required to reduce the maintenance frequency of the vehicle such as gear change and oil change and to reduce the vehicle inspection cost. For this reason, it is desired that the load of the vehicle be estimated with higher accuracy for each travel route, and that a travel route with the lower load be more reliably selected.

The present disclosure has been made in view of the above issues. An object of the present disclosure is to provide a travel route guidance device and a travel route guidance method capable of presenting the load of the vehicle for each travel route with high accuracy.

A travel route guidance device according to the present disclosure includes:
a route acquisition unit that acquires a plurality of travel routes from a current position of a vehicle to a destination;
a gradient distribution acquisition unit that acquires distribution of a gradient of a road surface of each of the travel routes;
a vehicle speed acquisition unit that acquires a vehicle speed of another vehicle that is traveling on each of the travel routes;
a load estimation unit that estimates a load of the vehicle when the vehicle travels on a travel route based on the distribution of the gradient and the vehicle speed for each travel route; and
a notification unit that notifies an occupant of the vehicle of the travel routes and the load.

In the above configuration, the vehicle speed acquisition unit may acquire traffic congestion information indicating a traffic congestion status of each of the travel routes, and estimate the vehicle speed based on the traffic congestion information.

In the above configuration, the vehicle speed acquisition unit may determine a congested section and a non-congested section in the travel routes based on the traffic congestion information, and estimate the vehicle speed in the congested section according to a degree of traffic congestion.

In the above configuration, the vehicle speed acquisition unit may estimate the vehicle speed in the non-congested section of each of the travel routes from a time change in a position of the other vehicle traveling on the non-congested section.

In the above configuration, the vehicle speed acquisition unit may estimate the vehicle speed in the non-congested section of each of the travel routes from a legal speed of the non-congested section.

In the above configuration, the load estimation unit may estimate the load from a database in which a correlation between the vehicle speed and the load corresponding to the gradient is registered.

In the above configuration,
when the travel routes pass through a common via point, the load estimation unit may estimate the load when the vehicle travels on each of a first section from the current position of the vehicle to the via point and a second section from the via point to the destination, and
the notification unit may notify of the load of each of the first section and the second section of each of the travel routes.

In the above configuration, the travel route guidance device may include:
a curvature distribution acquisition unit that acquires distribution of curvature of a curve of each of the travel routes; and
a difference estimation unit that estimates a difference of a rotational speed of each of a set of drive wheels of the vehicle for each travel route from the distribution of the curvature. The load estimation unit may estimate, based on the distribution of the gradient, the vehicle speed, and the difference of the rotational speed for each travel route, the load of the vehicle when the vehicle travels on the travel route.

In the above configuration, the travel route guidance device may further include a temperature acquisition unit that acquires a temperature of a transmission oil of the vehicle. The load estimation unit may calculate a temperature increase amount of the transmission oil of the vehicle when the vehicle travels on the travel route based on the distribution of the gradient and the vehicle speed for each travel route, and estimate the load from the temperature and the temperature increase amount.

In the above configuration, the notification unit may notify of the travel routes, the load, and a time required to the destination when the vehicle travels on each of the travel routes.

A travel route guidance method according to the present disclosure includes causing a computer to execute processes. The processes include:
a process of acquiring a plurality of travel routes from a current position of a vehicle to a destination;
a process of acquiring distribution of a gradient of a road surface of each of the travel routes;
a process of acquiring a vehicle speed of another vehicle traveling on each of the travel routes;
a process of estimating a load of the vehicle when the vehicle travels on a travel route based on the distribution of the gradient and the vehicle speed for each travel route; and a process of notifying an occupant of the vehicle of the travel routes and the load.

In the above method, in the process of acquiring the vehicle speed, traffic congestion information indicating a traffic congestion status of each of the travel routes may be acquired, and the vehicle speed may be estimated based on the traffic congestion information.

In the above method, in the process of acquiring the vehicle speed, a congested section and a non-congested section in the travel routes may be determined based on the traffic congestion information, and the vehicle speed in the congested section may be estimated according to a degree of traffic congestion.

In the above method, in the process of acquiring the vehicle speed, the vehicle speed in the non-congested section of each of the travel routes may be estimated from a time change in a position of the other vehicle traveling on the non-congested section.

In the above method, in the process of acquiring the vehicle speed, the vehicle speed in the non-congested section of each of the travel routes may be estimated from a legal speed of the non-congested section.

In the above method, in the process of estimating the load, the load may be estimated from a database in which a correlation between the vehicle speed and the load corresponding to the gradient is registered.

In the above method,
in the process of estimating the load, when the travel routes pass through a common via point, the load when the vehicle travels on each of a first section from the current position of the vehicle to the via point and a second section from the via point to the destination may be estimated; and
in the process of notifying of the load, the load of each of the first section and the second section of each of the travel routes may be notified.

The above method may further include:
acquiring distribution of curvature of a curve of each of the travel routes; and
estimating a difference of a rotational speed of each of a set of drive wheels of the vehicle for each travel route from the distribution of the curvature.

In the process of estimating the load, the load of the vehicle when the vehicle travels on the travel route may be estimated based on the distribution of the gradient, the vehicle speed, and the difference of the rotational speed for each travel route.

The above method may further include acquiring a temperature of a transmission oil of the vehicle.

In the process of estimating the load, a temperature increase amount of the transmission oil of the vehicle when the vehicle travels on the travel route may be calculated based on the distribution of the gradient and the vehicle speed for each travel route, and the load may be estimated from the temperature and the temperature increase amount.

In the above method, in the process of notifying of the load, the travel routes, the load, and a time required to the destination when the vehicle travels on each of the travel routes may be notified.

According to the present disclosure, it is possible to present the load of the vehicle for each travel route with high accuracy.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein:

FIG. 12 is a flowchart showing the travel route guidance process according to the third embodiment.

DETAILED DESCRIPTION OF EMBODIMENTS

Travel Route Guidance System

Figure 1:
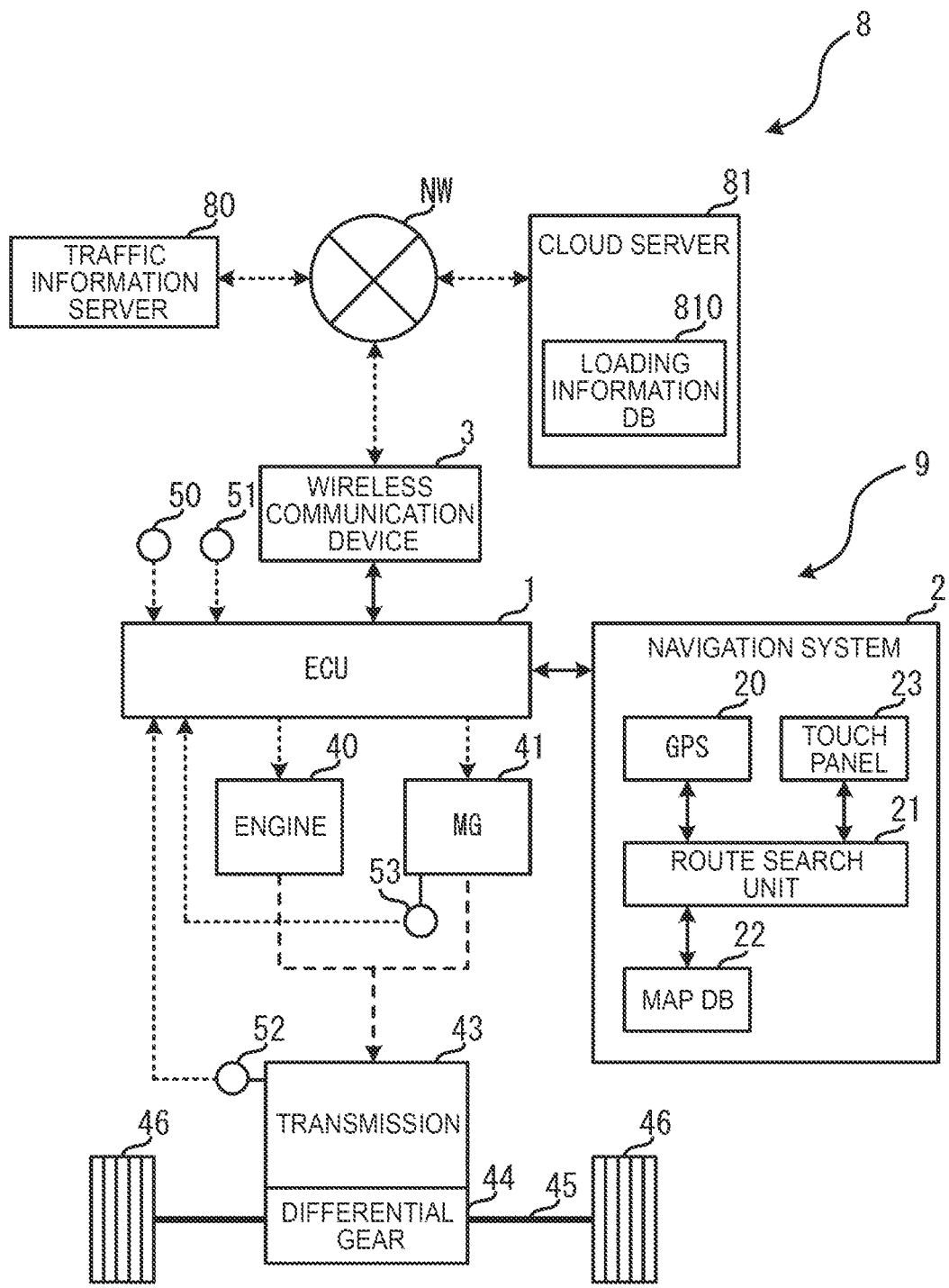
FIG. 1 is a configuration diagram illustrating an example of a travel route guidance system.

FIG. 1 is a configuration diagram illustrating an example of a travel route guidance system 8. The travel route guidance system 8 includes a vehicle 9, a traffic information server 80, and a cloud server 81. The vehicles 9, the traffic information server 80, and the cloud server 81 are respectively connected to a communication network NW such as the Internet.

The traffic information servers 80 provide various types of information regarding traffic conditions to the vehicles 9 via the communication network NW. The information includes traffic congestion information indicating a congestion state of a road, position information indicating a position of another vehicle, and the like. The traffic congestion information indicates the presence or absence of congestion and the degree of congestion. Further, the position information is position information received from vehicles equipped with a Global Positioning System (GPS), for example.

The cloud server 81 is a device for estimating a load (hereinafter referred to as a torque load) based on the torque of the vehicle 9. The cloud server 81 has a load information database (DB) 810 in which correlations between the vehicle speed and the torque load of the vehicle 9 are registered. The cloud server 81 calculates a torque load from the load information DB 810 in response to a request from the vehicle 9 via the communication network NW, and transmits the torque load to the vehicle 9.

Vehicles 9 are hybrid electric vehicle as an example, but not limited to. The vehicles 9 may be gasoline-powered vehicles or battery electric vehicle. The vehicle 9 includes an ECU 1, a navigation system 2, a wireless communication device 3, an engine 40, a motor generator (MG) 41, transmission 43, differential gear 44, axle 45, and a set of drive wheels 46. The vehicle 9 includes a vehicle speed sensor 50, an outside air temperature sensor 51, an oil temperature sensor 52, and a motor temperature sensor 53 as sensor systems.

The wireless communication device 3 includes wireless communication circuitry compliant with, for example, WiFi (registered trademark), 4th Generation (4G), or 5th Generation (5G). ECU 1 communicates with the traffic information server 80 and the cloud server 81 via the communication network NW by the wireless communication device 3.

ECU 1 controls the output-torque of the engine 40 and MG 41 in accordance with the operation of the driver. The engine 40 and MG 41 each provide torque to the transmission 43. The transmission 43 changes the rotational speed of the engine 40 and MG 41. The differential gear 44 is coupled to the axle 45 of the drive wheel 46.

The differential gear 44 transmits the power of the transmission 43 to each of the drive wheels 46 so that a difference occurs in the rotational speed of each of the drive wheels 46. The differential gear 44 includes a pair of side gears connected to the respective drive wheels 46, and a pinion gear positioned between the side gears. When the vehicle 9 turns to either the left or the right, the side gear of one of the drive wheels 46 corresponding to the turning direction meshes with the pinion gear so that the number of revolutions is higher than that of the side gear of the other drive wheel 46.

Further, ECU 1 is used for various processes by acquiring respective detected values from the vehicle speed sensor 50, the outside air temperature sensor 51, the oil temperature sensor 52, and the motor temperature sensor 53. The vehicle speed sensor 50 detects the speed of the vehicle 9. The outside air temperature sensor 51 detects the outside air temperature of the vehicle 9. The oil temperature sensor 52 detects the temperature of the transmission oil that lubricates and cools the transmission 43 and the differential gear 44. The motor temperature sensor 53 detects the temperature of MG 41, for example, from the coolant of MG 41.

The navigation system 2 searches for a travel route from the current position on the map to the destination in accordance with an operation of the driver. The navigation system 2 includes, for example, a GPS 20, a route search unit 21, and a map database (DB) 22 and touch panel 23.

GPS 20 acquires the current position (latitude and longitude) of the vehicles 9. The map database 22 is stored in advance in a storage device such as a memory. The map database 22 includes map information about a road. The map database 22 includes not only the route of the road but also the slope and curvature distribution of the road surface along the road. The touch panel 23 displays a map based on the map DB 22, and receives, for example, a destination from the drivers.

The route search unit 21 is realized by a computer such as a microcontroller, for example. Based on the current position acquired by GPS 20, the destination inputted from the touch panel 23, and the map DB 22, the route search unit 21 searches for a plurality of travel routes from the current position to the destination, a travel distance thereof, and a scheduled arrival time of the destination.

ECU 1 is an exemplary travel route guidance device and a computer. ECU 1 cooperates with the navigation system 2 to estimate the loads on the vehicles 9 for each travel route and present the estimated loads to the drivers. The travel route guidance device may be a single device having the functions of ECU 1 and the navigation system 2.

Example 1

Figure 2:
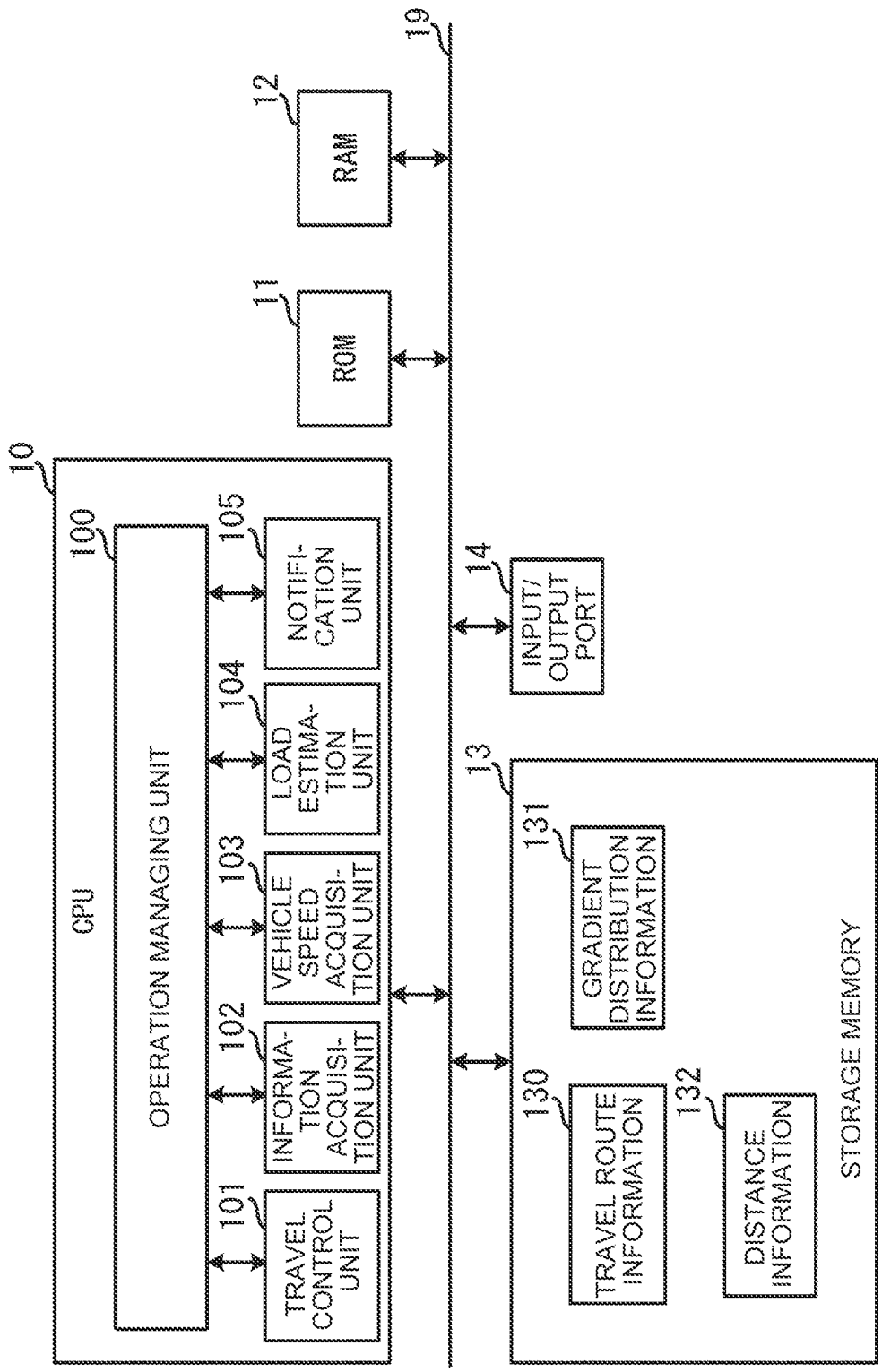
FIG. 2 is a configuration diagram showing an Electronic Control Unit (ECU) of the first embodiment.

FIG. 2 is a configuration diagram illustrating ECU 1 of the first embodiment. ECU 1 is a computer such as a microcontroller, and includes a Central Processing Unit (CPU) 10, Read Only Memory (ROM) 11, Random Access Memory (RAM) 12, a storage memory 13 such as a flash memory, and an input/output port 14. CPU 10 is electrically connected to ROM 11, RAM 12, the storage memory 13, and the input/output port 14 via a bus 19 so as to be able to input and output signals.

ROM 11 stores a program for driving CPU 10. RAM 12 functions as a working memory of CPU 10. The input/output port 14 is a circuit that performs an input/output process of data between CPU 10, the navigation system 2, the wireless communication device 3, the engine 40, and MG 41 controllers (not shown), the vehicle speed sensor 50, the outside air temperature sensor 51, the oil temperature sensor 52, and the motor temperature sensor 53.

When a program is read from ROM 11, CPU 10 functions as an operation managing unit 100, a travel control unit 101, an information acquisition unit 102, a vehicle speed acquisition unit 103, a load estimation unit 104, and a notification unit 105. The operation managing unit 100 controls the entire operation of ECU 1. The operation managing unit 100 instructs the travel control unit 101, the information acquisition unit 102, the vehicle speed acquisition unit 103, the load estimation unit 104, and the notification unit 105 to perform an operation in accordance with a predetermined sequence.

The travel control unit 101 instructs the engine 40 and MG 41 to output torque in response to the accelerator and the brake of the driver.

The information acquisition unit 102 is an example of a route acquisition unit and a gradient distribution acquisition unit. The information acquisition unit 102 acquires information 130 of the travel route (hereinafter, referred to as travel route information) from the navigation system 2. The information acquisition unit 102 stores the travel route information in the storage memory 13.

Further, the information acquisition unit 102 acquires, from the navigation system 2, information (hereinafter, referred to as gradient distribution information) 131 on the distribution of the gradients of the road surfaces of the respective travel routes. The information acquisition unit 102 stores the gradient distribution information 131 in the storage memory 13.

Further, the information acquisition unit 102 acquires information (hereinafter, referred to as distance information) 132 on the travel distance of each travel route from the navigation system 2. The information acquisition unit 102 stores the distance information 132 in the storage memory 13.

The vehicle speed acquisition unit 103 acquires the vehicle speed of another vehicle traveling on each travel route. For example, the vehicle speed acquisition unit 103 acquires the traffic congestion information from the traffic information server 80 via the wireless communication device 3, and estimates the vehicle speed based on the traffic congestion information. Therefore, the vehicle speed acquisition unit 103 can easily acquire the vehicle speed from the congestion state of the current travel route.

The load estimation unit 104 estimates the load of the vehicle 9 when the vehicle travels on each traveling route based on the distance, the gradient distribution, and the vehicle speed. The load estimation unit 104 calculates a torque load per unit-distance based on the load information DB 810 of the cloud server 81 from the gradient distribution information and the vehicle speed for each travel route. The load estimation unit 104 calculates the load by multiplying the torque load per unit distance for each travel route by the travel distance indicated by the distance information 132. As described above, the load estimation unit 104 can estimate the load with high accuracy from the slope and the vehicle speed for each traveling route.

The notification unit 105 notifies the driver of each travel route and the load described above. More specifically, the notification unit 105 requests the navigation system 2 to display each travel route and load. The navigation system 2 displays, on the touch panel 23, the respective travel routes and loads searched by the route search unit 21. As a result, the driver can select the traveling route in consideration of the load of the vehicle 9 caused by the traveling. The driver is an example of an occupant of the vehicle 9, and the notification unit 105 may notify an occupant other than the driver of each travel route and load.

Estimation of Torque Load

Figure 3:
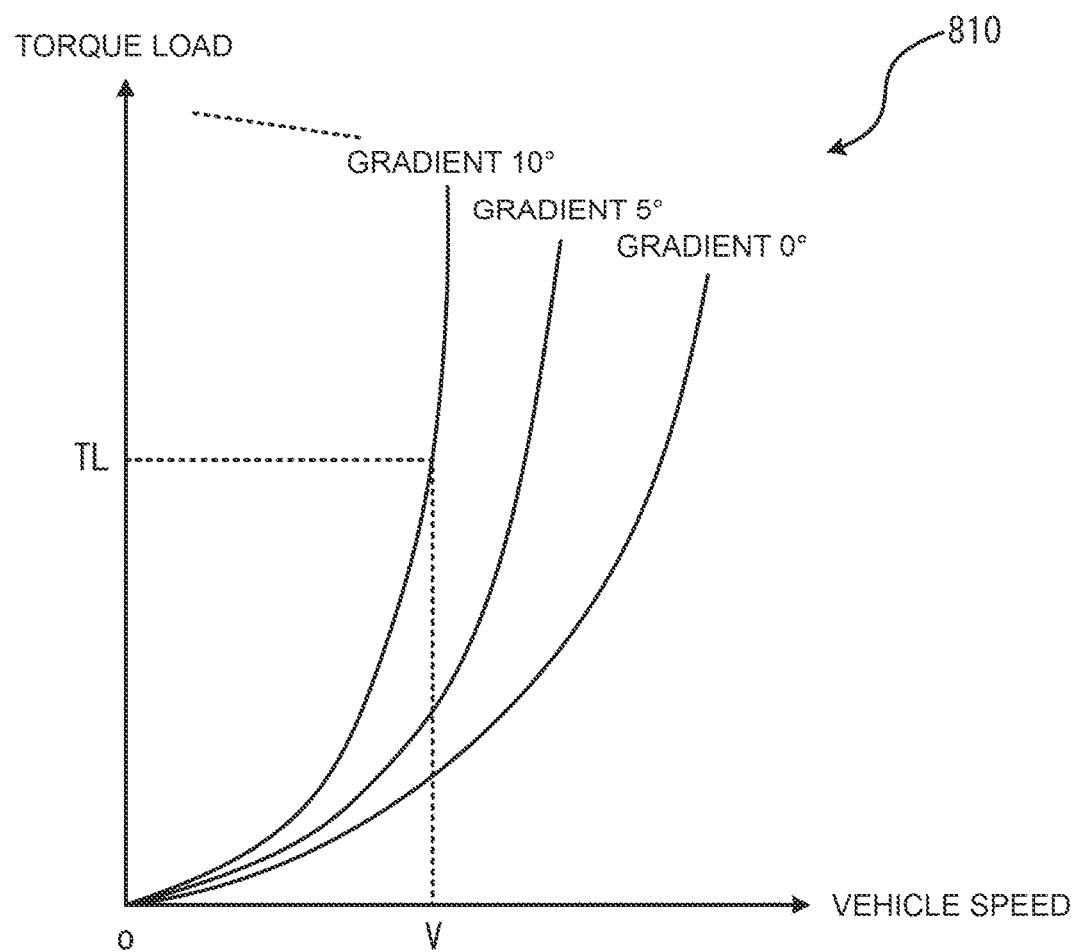
FIG. 3 is a diagram illustrating an example of a load information database.

FIG. 3 is a diagram illustrating an exemplary load information DB 810. The load information DB 810 is an example of a data base in which correlations between the vehicle speed and the load according to the gradient are registered. In the graph of FIG. 3, the horizontal axis represents the vehicle speed estimated by the vehicle speed acquisition unit 103. The vertical axis represents the torque-load per unit-distance (e.g., 1 km) occurring in the vehicles 9. The correlation between vehicle speed and torque load is shown for each slope (e.g., 0°, 5°, 10°, . . . ).

The torque load is represented by $T^k$ (k: a factor determined according to the material and configuration of the transmission 43), where T (N·m) is the torque inputted to the transmission 43 from at least one of the engine 40 and MG 41. In this example, the tonnage load varies in a quadratic manner with respect to the vehicle speed, but the correlation between the tonnage load and vehicle speed is determined as appropriate according to the characteristics of the vehicle 9.

The load estimation unit 104 calculates a torque load from the load information DB 810 for each section of the predetermined distance D1 (for example, 5 km) of the respective travel routes, for example. For example, if the vehicle speed in a certain section of the travel route is V and the mean slope in that section is 10°, the torque-load per unit-distance D2 is TL. Therefore, the load estimation unit 104 can calculate the torque load in the section by multiplying the torque load TL by D1/D2. The predetermined distance D1 and the unit distance D2 may be the same.

As described above, the load estimation unit 104 estimates the load from the database in which the correlation between the vehicle speed and the load corresponding to the gradient is registered. Therefore, the load estimation unit 104 can easily calculate the load without complicated calculation.

Estimation of Vehicle Speed

Next, an example of a vehicle speed estimation unit of another vehicle traveling on the traveling route will be described. The vehicle speed acquisition unit 103 of the present example estimates the vehicle speed from the traffic congestion information held by the traffic information server 80. However, the vehicle speed acquisition unit 103 of the present example is not limited to this. The vehicle speed acquisition unit 103 of the present example may acquire the vehicle speeds of other vehicles in each travel route collected by the cloud server 81.

Figure 4:
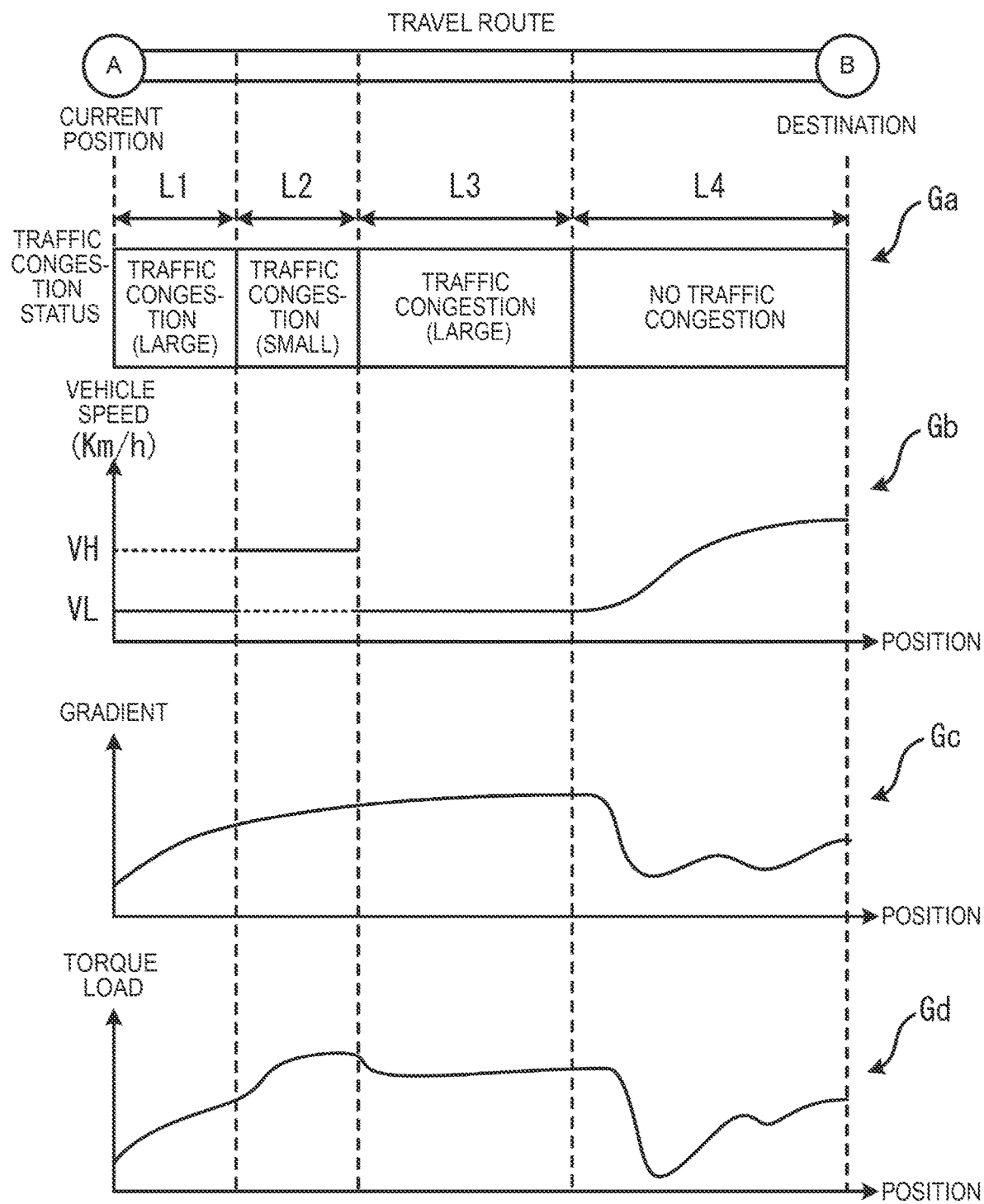
FIG. 4 is a diagram illustrating an example of calculation of a torque load according to a congestion state of a traveling route.

FIG. 4 is a diagram illustrating an example of calculation of a torque load according to a congestion state of a traveling route. The vehicle speed acquisition unit 103 acquires the traffic congestion information for each travel route, and estimates the vehicle speed based on the traffic congestion information. The traffic congestion information indicates the degree of traffic congestion for each of sections L1 to L4 in which the traffic congestion status is the same on the traveling route. For example, "large" indicates a high degree of congestion. "Traffic congestion (small)" indicates a low degree of traffic congestion. "No congestion" indicates that no congestion has occurred.

As indicated by reference numeral Ga, the congestion condition of the section L1 closest to the current position A on the traveling route is "congestion (large)". The congestion status of the section L2 subsequent to the section L1 is "congestion (small)". Further, the congestion status of the section L3 subsequent to the section L2 is "congestion (large)". It is closest to the destination B on the traveling route, and the traffic congestion status of the subsequent section L4 of the section L3 is "no traffic congestion". Accordingly, the vehicle speed acquisition unit 103 determines L3 and the non-congested section L4 from the congested section L1 in the traveling route based on the traffic congestion information.

The code Gb indicates the vehicle speed estimated by the vehicle speed acquisition unit 103 with respect to the position on the traveling route. The vehicle speed acquisition unit 103 estimates the vehicle speed in L3 from the congested section L1 from the degree of congestion. For example, the vehicle speed acquisition unit 103 estimates that the vehicle speed in the section L1, L3 of "traffic congestion (large)" is VL (Km/h). The vehicle speed acquisition unit 103 estimates that the vehicle speed in the section L2 of "traffic congestion (small)" is VH (Km/h). Here, VH is greater than VL. For example, VH is 3 (Km/h) and VL is 10 (Km/h). Accordingly, the vehicle speed can be estimated with high accuracy according to the degree of congestion.

Further, the vehicle speed acquisition unit 103 estimates the vehicle speed in the section L4 of the traveling route that is not congested from the temporal change of the position of the other vehicle traveling in the section L4. The vehicle speed acquisition unit 103 periodically acquires the position information of the other vehicles traveling in the section L4 a plurality of times from the traffic information servers 80. The vehicle speed acquisition unit 103 estimates the vehicle speed from the temporal change of the position indicated by the position information.

For example, it is assumed that position data of other vehicles traveling in the section L4 indicates P1, P2, . . . , Pn (latitude or longitude, for example) for each time interval T. Here, the vehicle speed acquisition unit 103 calculates the mean of $\Delta Pi/T$ (i=1, 2, . . . , n−1, n is a positive integer) as the vehicle speed, with the position Pi and the position Pi+1 as $\Delta P$. Further, the position information is not limited to one vehicle. As the position information, an average value of vehicle speeds may be calculated from the position information of a plurality of vehicles. The vehicle speed is calculated for each predetermined distance D1.

As described above, the vehicle speed acquisition unit 103 can estimate the vehicle speed with high accuracy from the temporal change of the position of the other vehicle. Further, the vehicle speed acquisition unit 103 is not limited to this, and may estimate the vehicle speed from, for example, the legal speed of the section L4. Here, the legal speed may be obtained from the map database 22, for example. The legal speed may be obtained from the traffic information server 80. When the vehicle speed is estimated from the legal speed, not only the above-described calculation process can be omitted, but also the vehicle speed can be estimated quickly even when there is no other vehicle traveling in the corresponding section L4. Further, as described above, when the cloud server 81 communicates with the vehicle, the vehicle speed may be collected and distributed as vehicle speed information. The vehicle speed acquisition unit 103 acquires the vehicle speed of the corresponding section L4 from the cloud server 81.

The sign Gc indicates a change in the gradient with respect to the position on the traveling route, that is, the gradient distribution information 131. In addition, the reference numeral Gd indicates a change in the torque-load with respect to the position on the traveling route. For example, in the section L1, the slope is increased as the position is closer to the destination B, and the vehicle speed is estimated to be VL. For this reason, the torque-loading of the section L1 increases as the gradient increases.

Further, in the section L2, the slope is increased as the position is closer to the destination B. However, the gradient is increased less than the immediately preceding interval L1. The vehicle speed is estimated to be a VH larger than the vehicle speed (VL) of the immediately preceding section L1. Therefore, the torque-load in the section L2 becomes larger than the section L1 by the increment of the vehicle speed. However, the increment for the position change becomes more gradual than the interval L1.

Further, in the section L3, the slope is increased as the position is closer to the destination B. However, the gradient increment is smaller than the immediately preceding interval L2. The vehicle speed is estimated to be a VL smaller than the vehicle speed (VH) of the immediately preceding section L2. Therefore, the torque-load in the section L3 is smaller than the section L2 by the decreasing amount of the vehicle speed. However, the increment for the position change becomes more gradual than the interval L2.

In the section L4, the slope increases or decreases according to the position. Further, it is assumed that the vehicle speed is estimated to increase as the vehicle approaches the destination B from the position information of the vehicle. For this reason, the torque-load in the section L4 increases as it approaches the destination B, and increases or decreases in accordance with the change in the gradient.

As described above, the vehicle speed acquisition unit 103 estimates the vehicle speed on the traveling route based on the traffic congestion information acquired from the traffic information server 80, and thus it is possible to calculate the load of the vehicle 9 with high accuracy according to the traffic congestion status. The load estimation unit 104 calculates the load of the vehicle 9 by summing the torque loads corresponding to the positions on the travel route. Specifically, the sum of the torque loads for each predetermined distance D1 is presented to the drivers as a load.

Travel Route Guidance Screen

The notification unit 105 instructs the navigation system 2 to display the travel route guidance screen. The navigation system 2 displays a travel route guidance screen on the touch panel 23 in accordance with the instruction.

Figure 5:
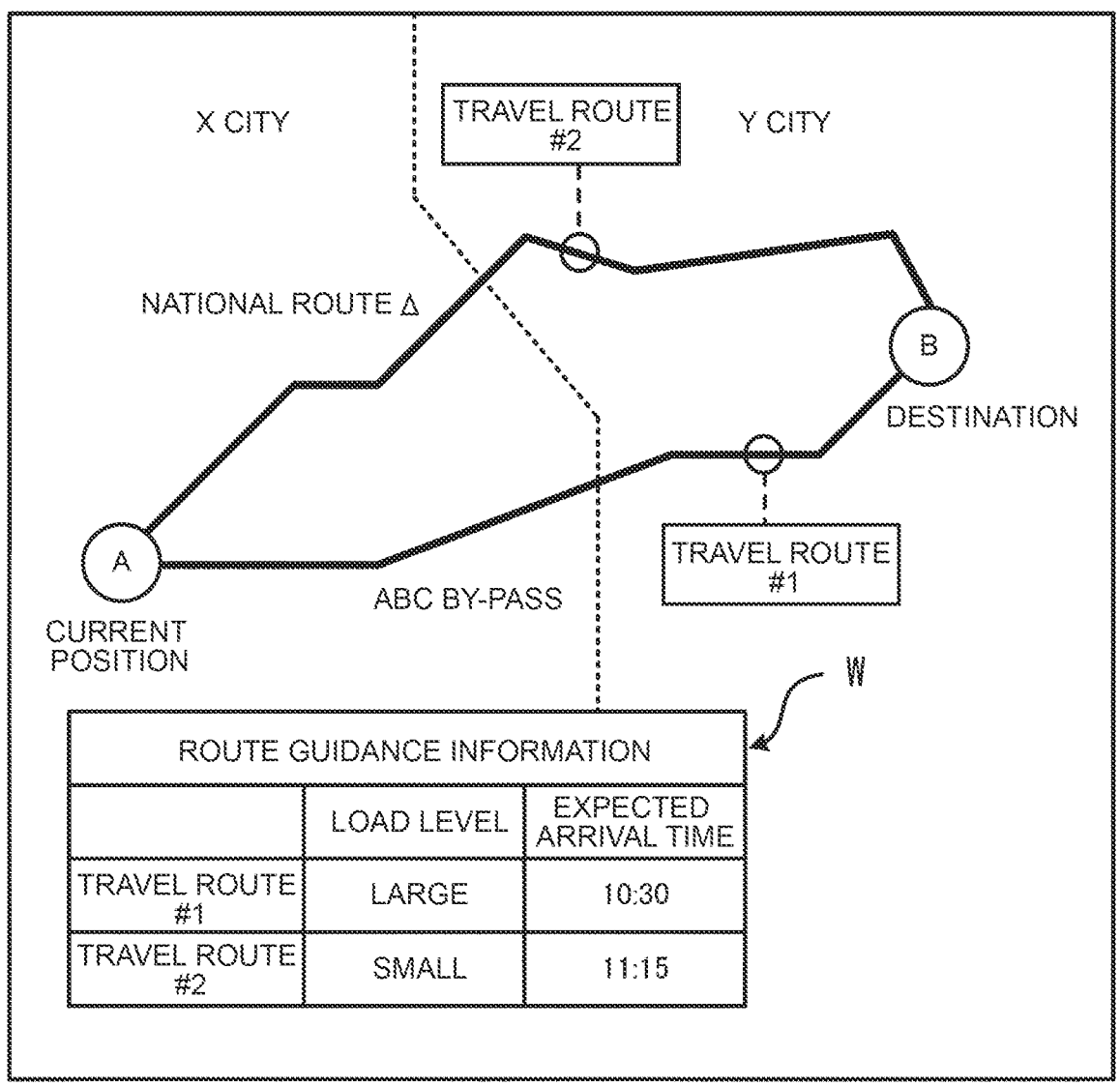
FIG. 5 is a diagram illustrating an example of a travel route guidance screen.

FIG. 5 is a diagram illustrating an example of a travel route guidance screen. The travel route guidance screen includes travel routes #1 and #2 on the map and route guidance information W. The route guidance information W includes the load levels and the estimated arrival times of the travel routes #1 and #2.

The load estimation unit 104 determines a load level based on a comparison result between the estimated load and a predetermined reference load. When the load is greater than the reference load, the load estimation unit 104 sets the load level to "large". When the load the reference load, the load estimation unit 104 sets the load level to "small". In the present example, the load level of the traveling route #1 is "large". The load level of the travel route #2 is "small".

Further, the route search unit 21 of the navigation system 2 calculates the time required when the vehicle 9 travels on the traveling routes #1 and #2. For the calculation, for example, the vehicle speed estimated by the vehicle speed acquisition unit 103 may be used. The navigation system 2 calculates and displays an estimated arrival time to the destination B when traveling on each of the traveling routes #1 and #2 from the current time and the required time.

The driver determines which travel route #1 and #2 is to be selected by looking at the travel route guidance screen. For example, the driver can select the traveling route #2 having a small load according to the load level. The driver can also select the traveling route #1 that can arrive earlier according to the expected arrival time.

As described above, the notification unit 105 notifies the travel routes #1 and #2, the load level, and the required time to the destination B when the vehicle travels on the travel routes #1 and #2. Therefore, the driver can select the travel routes #1 and #2 in consideration of the load and the required time.

In addition, in a case where the traveling routes #1 and #2 pass through a common via point, the notification unit 105 may display a load level when traveling through each of a section from the current position A to the via point of the vehicle 9 and a section from the via point to the destination B.

Figure 6:
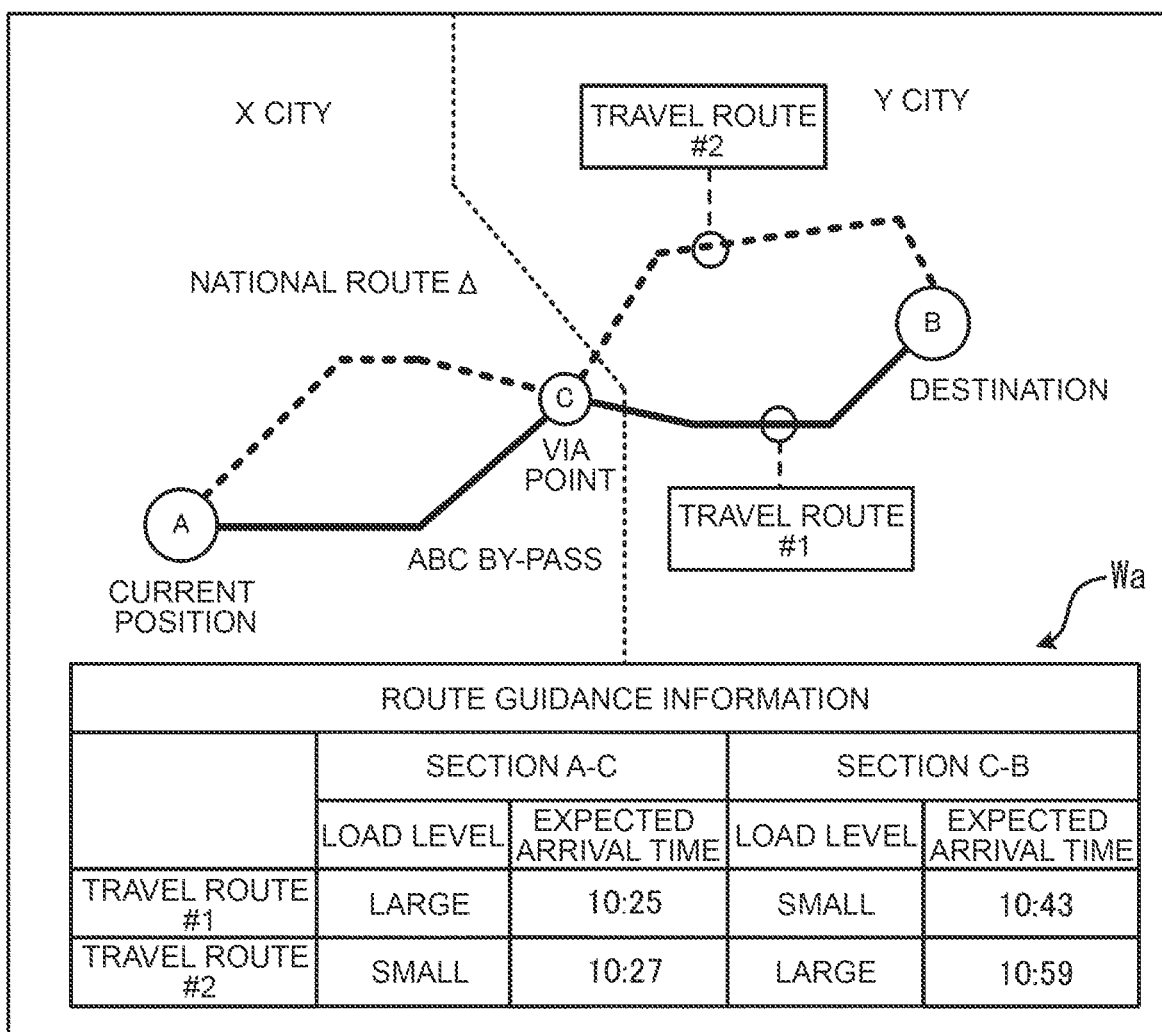
FIG. 6 is a diagram illustrating another example of a travel route guidance screen.

FIG. 6 is a diagram illustrating another example of a travel route guidance screen. The travel route guidance window includes respective travel routes #1 and #2 on the map and route guidance information Wa. The route guidance information Wa includes the load-level and the expected arrival time of the travel routes #1 and #2.

In the present example, the traveling routes #1 and #2 pass through a common via point C. Therefore, the load estimation unit 104 estimates the load when the vehicle 9 travels through each of the section A-C from the current position A to the via point C and the section C-B from the via point C to the destination B. Thus, the route guidance information Wa includes A-C of each of the travel routes #1 and #2 and the load-level when each of the sections C-B is traveled.

Therefore, for example, when the driver prioritizes that the load level is low, the driver can select the traveling route #2 from the current position A to the via point C and select the traveling route #1 from the via point C to the destination B. This is effective in the traveling routes #1 and #2 having many branch points. Note that the section A-C is an example of the first section, and the section C-B is an example of the second section.

As described above, the notification unit 105 notifies the respective loads of the section A-C and the section C-B of the traveling routes #1 and #2. Therefore, the driver can partially select the traveling routes #1 and #2.

Handling ECU

Figure 7:
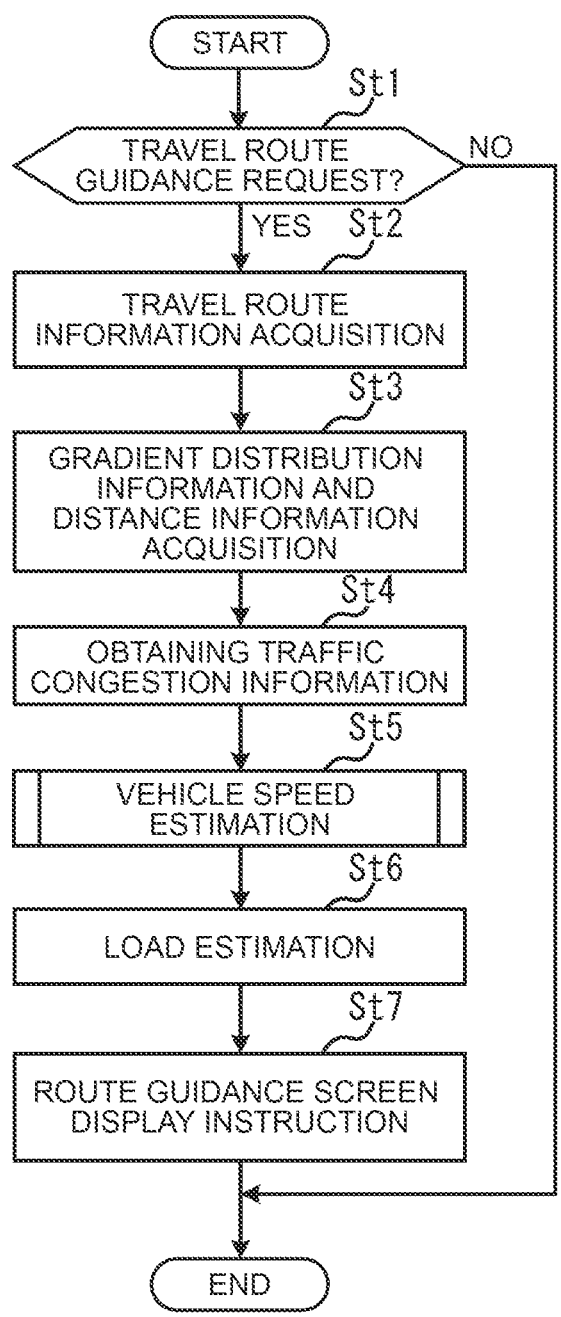
FIG. 7 is a flowchart illustrating a travel route guidance process according to the first embodiment.

FIG. 7 is a flowchart illustrating a travel route guidance process according to the first embodiment. The travel route guidance processing is an example of a travel route guidance method. When activated, ECU 1 executes a travel route guidance process.

First, the operation managing unit 100 determines whether or not a driving route guidance is requested from the driver via the navigation system 2 (step St1). For example, the navigation system 2 detects a travel route guidance request and outputs the detected travel route guidance request to ECU 1 by receiving an input-operation of the touch panel 23 from the driver. When the traveling route guidance is not requested (No in step St1), the process ends.

When the travel route guidance is requested (Yes in step St1), the information acquisition unit 102 acquires the travel route information 130 from the navigation system 2 (step St2). The travel route information 130 indicates a plurality of travel routes based on the map database 22.

Next, the information acquisition unit 102 acquires the gradient distribution information 131 and the distance information 132 for each travel route (step St3). At least one of the gradient distribution information 131 and the distance information 132 may be integrated with the travel route information 130.

Next, the vehicle speed acquisition unit 103 acquires the traffic congestion information of the traveling route from the traffic information server 80 via the wireless communication device 3 (step St4). The vehicle speed acquisition unit 103 transmits, for example, the travel route information 130 to the traffic information server 80. The traffic information server 80 transmits traffic information corresponding to the travel route indicated by the travel route information 130 to the wireless communication device 3.

Next, the vehicle speed acquisition unit 103 estimates the vehicle speeds of the other vehicles on the respective travel routes based on the traffic congestion information (step St5). The estimation processing of the vehicle speed will be described later.

Next, the load estimation unit 104 estimates the load of the vehicle 9 during traveling on the basis of the travel route information 130, the gradient distribution information 131, and the distance information 132 for the traveling routes (step St6). The load estimation unit 104 calculates the torque load per unit distance by referring to the load information database 810 from the mean value of the gradient and the vehicle speed for each predetermined distance D1. The load estimation unit 104 calculates the total torque load corresponding to the distance indicated by the distance information 132 as a load. When there is a common via point in each traveling route, the load estimation unit 104 calculates the load of the vehicle 9 at the time of traveling in the section from the current position to the via point and the section from the via point to the destination, as described above. Further, the load estimation unit 104 determines the load level from the comparison result between the load and the threshold value.

Next, the notification unit 105 instructs the navigation system 2 to display the route guidance screen (step St7). Thus, the driver is notified of each travel route, the load level, and the expected arrival time. In this way, the travel route guidance processing is executed.

Figure 8:
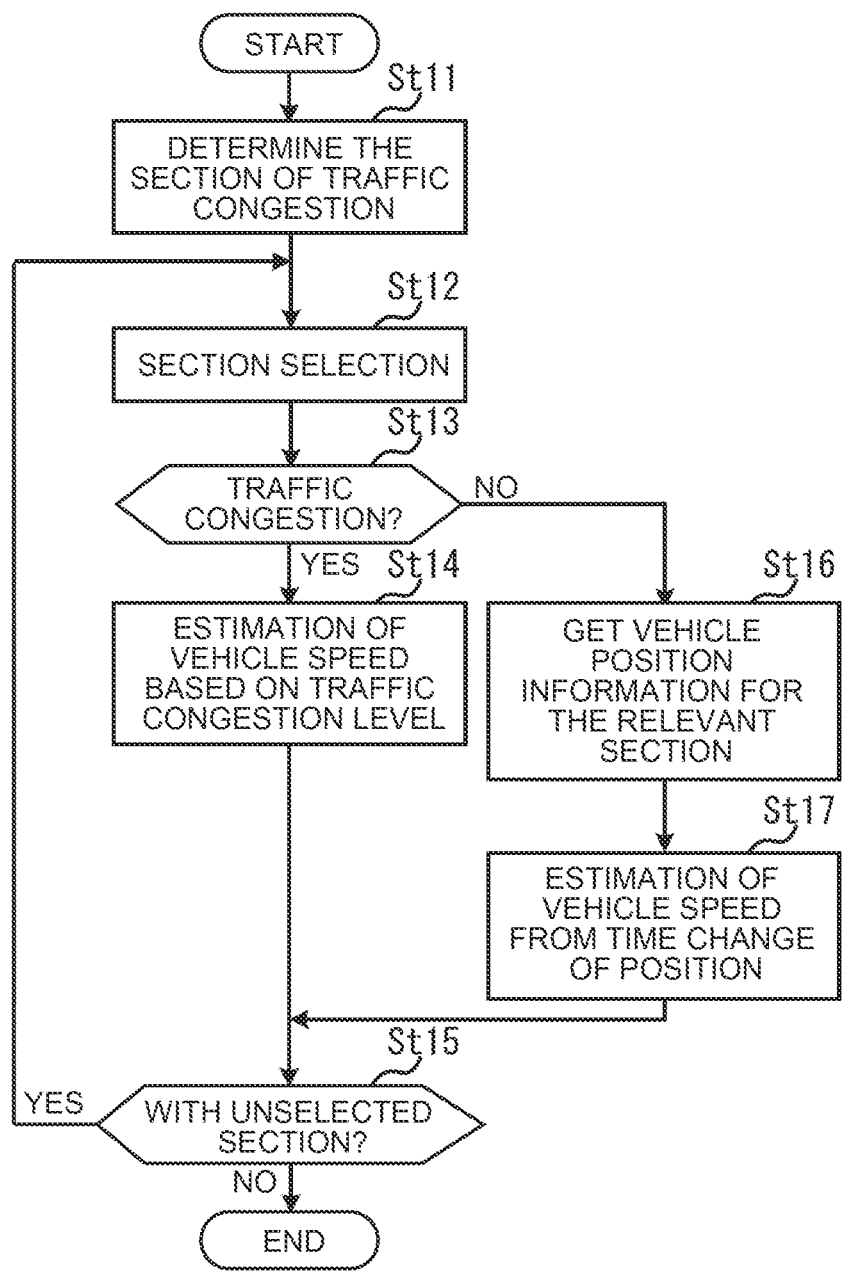
FIG. 8 is a flowchart illustrating an example of a vehicle speed estimation process.

FIG. 8 is a flowchart illustrating an example of a vehicle speed estimation process. This process is executed in the above-described St5 of steps.

The vehicle speed acquisition unit 103 determines, from the traffic congestion information, a section in which the congestion is occurring and a section in which the congestion is not occurring (step St11). In the above-described embodiment, the section in which the congestion is occurring is L3 (congestion (large) and congestion (small)) from the section L1, and the section in which the congestion is not occurring is the section L4 (no congestion).

Next, the vehicle speed acquisition unit 103 selects one of the identified sections (step St12). There is no limitation on the selection order. However, for example, the selection may be performed in an order from the section closest to the current position of the vehicle 9 to the section closest to the destination on the traveling route.

Next, the vehicle speed acquisition unit 103 determines whether or not traffic congestion is occurring in the selected section based on the determination result (step St13). When a congestion is occurring in the selected section (Yes in step St13), the vehicle speed acquisition unit 103 estimates the vehicle speed from the degree of congestion in the corresponding section indicated by the traffic congestion information (step St14). In the case of the above-described example, the vehicle speed is estimated to be VL in the case of a congestion (large) section. The vehicle speed is estimated to be VH in a traffic congestion (small) section. Since the vehicle speed is slow in the section where the traffic congestion is occurring, if the vehicle speed is estimated from the time change of the position information of the vehicle, the processing time becomes longer than the above-described method.

On the other hand, if no congestion has occurred in the selected section (No in step St13), the vehicle speed acquisition unit 103 acquires the position information of the other vehicles traveling in the selected section from the traffic information servers 80 (step St16). The position information acquired here is not limited to one vehicle, and the position information of two or more vehicles may be acquired.

Next, the vehicle speed acquisition unit 103 estimates the vehicle speed from the temporal change of the position indicated by the position information (step St17). At this time, the vehicle speed is calculated from, for example, a deviation of a position at a predetermined time interval (that is, a moving distance of the vehicle). In addition, when the position information of the plurality of vehicles is acquired, the vehicle speed acquisition unit 103 may calculate an average value of the vehicle speeds of the respective vehicles.

After the step St14 and St17, the vehicle speed acquisition unit 103 determines whether or not there is an unselected section (step St15). When there is an unselected section (Yes in step St15), the vehicle speed acquisition unit 103 selects another section (step St12), and executes the process after step St13 again. If there is no unselected section (No in St15 of steps), the process ends. In this way, the estimation process of the vehicle speed is executed. Note that the vehicle speed acquisition unit 103 may acquire the vehicle speed of another vehicle from the cloud server 81 instead of the steps St16, St17. Alternatively, the vehicle speed acquisition unit 103 may estimate the vehicle speed from the legal speed.

Example 2

In the present embodiment, ECU 1 estimates the load of the differential gear 44 as the load of the vehicle 9 from the curvature of the curve of the traveling route.

Figure 9:
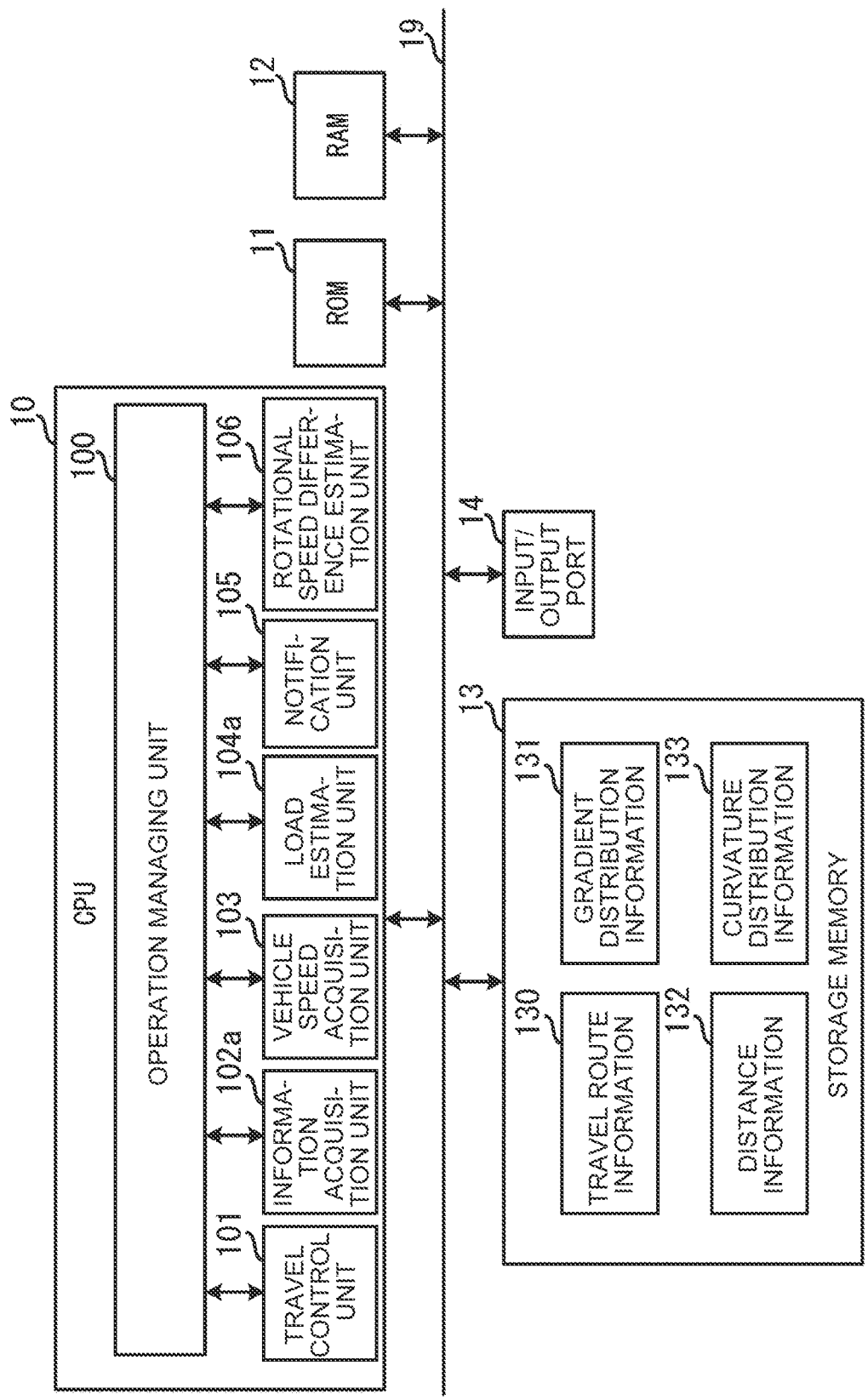
FIG. 9 is a configuration diagram showing ECU of the second embodiment.

FIG. 9 is a configuration diagram illustrating ECU 1 of the second embodiment. In FIG. 9, the same components as those in FIG. 2 are denoted by the same reference numerals. The description thereof will be omitted. When a program is read from ROM 11, CPU 10 functions as an operation managing unit 100, a travel control unit 101, an information acquisition unit 102a, a vehicle speed acquisition unit 103, a load estimation unit 104a, a notification unit 105, and a rotational speed difference estimation unit 106.

The information acquisition unit 102a is an exemplary route acquisition unit, a gradient distribution acquisition unit, and a curvature distribution acquisition unit. In addition to the travel route information 130, the gradient distribution information 131, and the distance information 132, the information acquisition unit 102a acquires the curvature distribution information 133 indicating the distribution of the curvature of the curve of each travel route. The information acquisition unit 102a stores the curvature distribution information 133 in the storage memory 13.

The rotational speed difference estimation unit 106 is an example of a difference estimation unit. The rotational speed difference estimation unit 106 estimates, for each travel route, a difference in the number of revolutions of the set of drive wheels 46 of the vehicle 9 from the curvature distribution indicated by the curvature distribution information 133. For example, the rotational speed difference estimation unit 106 calculates a difference between the rotational speeds of the drive wheels 46 from the averages of the curvatures for each predetermined distance D1 of the respective travel routes. For the calculation, for example, a calculation formula corresponding to the design of the differential gear 44, the axle 45, and the drive wheels 46 may be used. In the calculation, map data indicating a correspondence relationship between the difference between the curvature and the rotational speed may be used.

The load estimation unit 104a estimates the load of the vehicle 9 from the difference between the load information DB 810 and the rotational speed. The load estimation unit 104a calculates a torque load from the load information DB 810 in the same manner as in the first embodiment, and calculates the load of the vehicle 9 from the difference between the torque load and the rotational speed. The load estimation unit 104a calculates the load by multiplying the torque load by the difference in the number of revolutions for each predetermined distance D1 by the torque load, for example, using the torque load of the load information DB 810 as the load per difference of one revolution.

Figure 10:
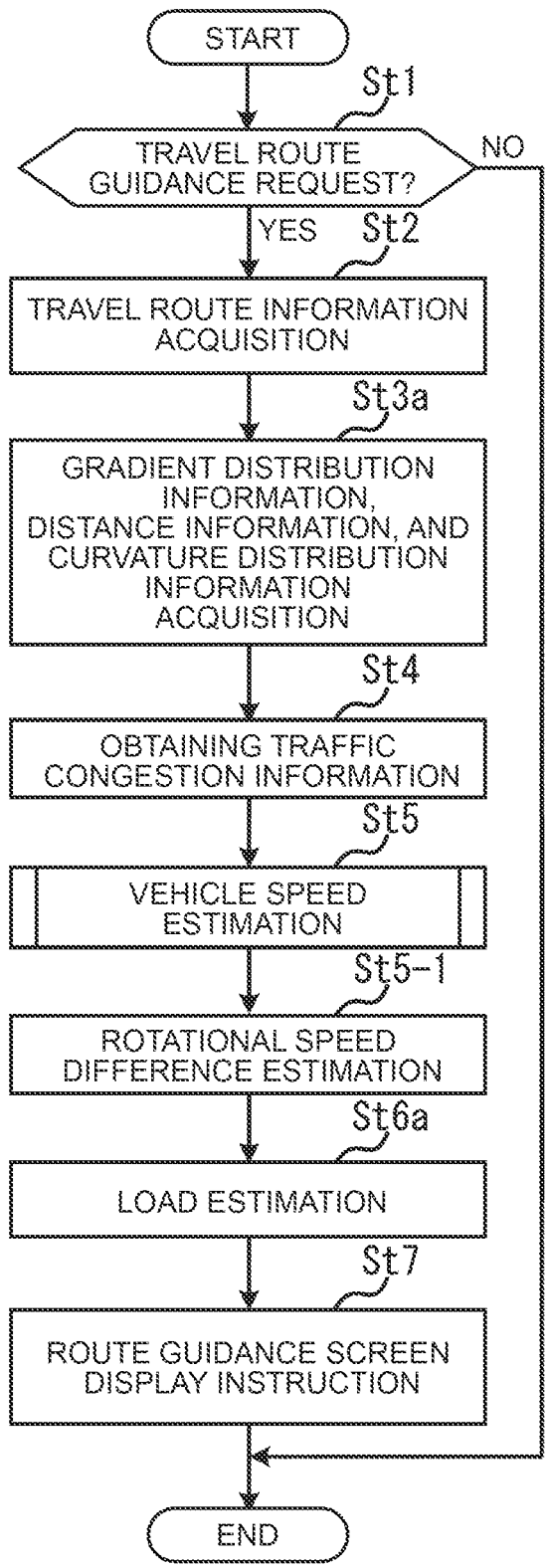
FIG. 10 is a flowchart illustrating a travel route guidance process according to the second embodiment.

FIG. 10 is a flowchart illustrating a travel route guidance process according to the second embodiment. In FIG. 10, the same processing as that in FIG. 7 is denoted by the same reference numerals, and the description thereof will be omitted.

After the process of the step St2, the information acquisition unit 102a acquires the gradient distribution information 131, the distance information 132, and the curvature distribution information 133 for each travel route (step St3a). At least one of the gradient distribution information 131, the distance information 132, and the curvature distribution information 133 may be integrated with the travel route information 130.

After the process of the step St5, the rotational speed difference estimation unit 106 estimates the difference in the rotational speed of the set of drive wheels 46 for each travel route based on the curvature distribution information 133 (step St5-1). At this time, the rotational speed difference estimation unit 106 calculates a difference in the number of rotations using a calculation equation or a data base, for example, from the mean of the curvature for each predetermined distance D1.

Next, the load estimation unit 104a estimates the load of the vehicle 9 from the difference between the load information DB 810 and the rotational speed (step St6a). At this time, the load estimation unit 104a calculates the load of the vehicle 9 by multiplying the torque load obtained from the load information DB 810 by the difference in the rotational speed. In this way, the travel route guidance processing is executed.

As described above, in the present embodiment, the load estimation unit 104a estimates the load by using the difference between the rotational speeds of the left and right drive wheels 46. Therefore, it is possible to estimate the load in consideration of the damage caused by the engagement of the left and right side gears and the pinion gear in the differential gear 44.

Example 3

In the present embodiment, ECU 1 estimates the thermal load caused by the temperature-rise of the transmission oil of the transmission 43 as the load of the vehicles 9.

Figure 11:
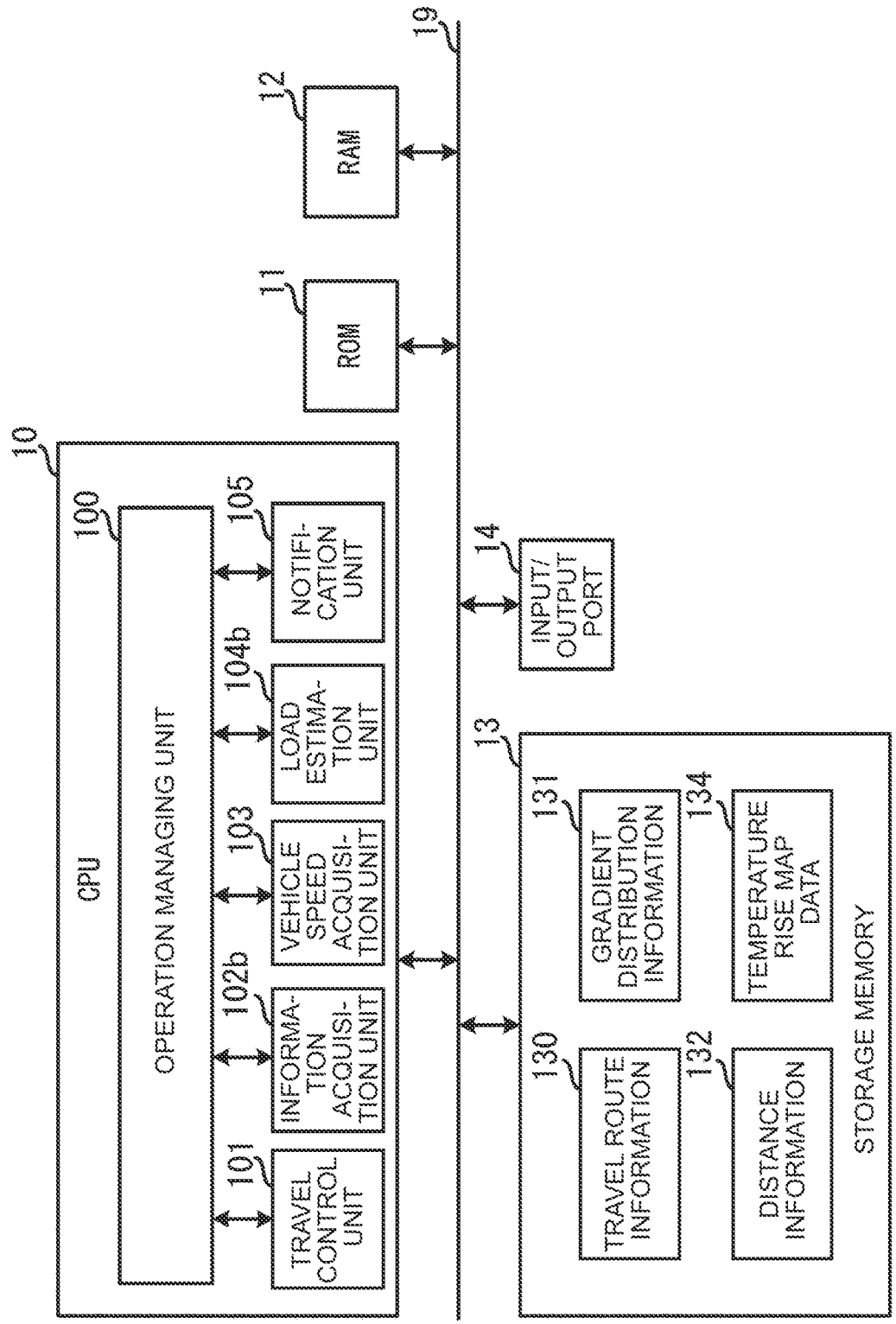
FIG. 11 is a configuration diagram showing ECU of the third embodiment.

FIG. 11 is a configuration diagram illustrating an ECU 1 according to a third embodiment. In FIG. 11, the same components as those in FIG. 2 are denoted by the same reference numerals, and description thereof will be omitted. When a program is read from ROM 11, CPU 10 functions as an operation managing unit 100, a travel control unit 101, an information acquisition unit 102b, a vehicle speed acquisition unit 103, a load estimation unit 104b, and a notification unit 105.

The information acquisition unit 102b is an example of a route acquisition unit, a gradient distribution acquisition unit, and a temperature acquisition unit. The information acquisition unit 102b acquires the temperature of the transmission oil from the oil temperature sensor 52 in addition to the travel route information 130, the gradient distribution information 131, and the distance information 132. Further, the information acquisition unit 102 acquires the vehicle speed, the outside air temperature, and the temperature of MG 41 coolant of the vehicle 9 from the vehicle speed sensor 50, the outside air temperature sensor 51, and the motor temperature sensor 53.

The load estimation unit 104b calculates a temperature increase amount of the transmission oil of the vehicle 9 when the vehicle travels on the traveling route based on the gradient distribution and the vehicle speed for each traveling route, and estimates the load of the vehicle 9 from the temperature increase amount and the temperature of the transmission oil.

The load estimation unit 104b calculates the torque load from the load information DB 810 by the same method as in the first embodiment, and calculates the temperature rise of the transmission oil by referring to the temperature rise map data 134 from the torque load, the vehicle speed of the vehicle 9, the outside air temperature, and the temperature of MG 41 coolant. The temperature rise map data 134 is stored in the storage memory 13. The temperature rise map data 134 indicates correlations between the torque load, the vehicle speed of the vehicle 9, the outside air temperature, the temperature of MG 41 coolant, and the temperature rise of the transmission oil.

The load estimation unit 104b calculates the mean temperature of the transmission oil corresponding to the respective traveling routes by adding the temperature increase to the present temperature of the transmission oil indicated by the oil temperature sensor 52. The load estimation unit 104b acquires a required time of travel for each travel route from the navigation system 2, and calculates a multiplication value of the mean temperature and the required time as the load of the vehicle 9.

FIG. 12 is a flowchart showing a travel route guidance process according to the third embodiment. In FIG. 12, the same processing as that in FIG. 7 is denoted by the same reference numerals, and the description thereof will be omitted.

After the process of the step St5, the information acquisition unit 102b acquires the temperature of the transmission oil, the vehicle speed of the vehicle 9, the outside air temperature, and the temperature of MG 41 coolant from the oil temperature sensor 52, the vehicle speed sensor 50, the outside air temperature sensor 51, and the motor temperature sensor 53 (step St5-2).

Next, the load estimation unit 104b estimates the torque load of the vehicle 9 from the load information DB 810 in the same manner as in the first embodiment (step St6b-1). Next, the load estimation unit 104b refers to the temperature rise map data 134 from the torque load, the vehicle speed of the vehicle 9, the outside air temperature, and the temperature of MG 41 coolant to calculate the temperature rise of the transmission oil (step St6b-2).

Next, the load estimation unit 104b calculates an average temperature corresponding to each traveling route from the sum of the temperature of the transmission oil and the temperature increase amount, and estimates a multiplication value of the average temperature and the required time of each traveling route as a load (step St6b-3). In this way, the travel route guidance processing is executed.

The transmission oil is oxidized by a heat load. Therefore, the viscosity of the transmission oil increases as the oxidation proceeds. The higher the viscosity of the transmission oil, the less likely it reaches the components inside the transaxle, such as the transmission 43 and the differential gear 44. In this case, damage such as adhesion wear of the sliding component may occur.

On the other hand, the load estimation unit 104b estimates the load for each traveling route from the temperature and the temperature rise of the transmission oil. Therefore, the driver can select the traveling route in consideration of the thermal load caused by the temperature rise of the transmission oil.

The above-described embodiments are preferred embodiments of the present disclosure. However, the preferred embodiment of the present disclosure is not limited thereto. Various modifications can be made to the preferred embodiments of the present disclosure without departing from the gist of the present disclosure.

What is claimed is:

1. A travel route guidance system comprising:
   a vehicle including a processor and a navigation system, wherein the navigation system includes a display; and
   a first server configured to communicate with the vehicle, the first server including a load information database, wherein the load information database stores a relationship between a vehicle speed value and a torque load value of the vehicle for a reference road surface gradient value, wherein the torque load value is represented by $T^k$, where T is a torque value that is input to a transmission of the vehicle from an engine or a motor generator of the vehicle, and k is a factor that is determined according to a configuration of the transmission,
   wherein the processor is configured to
      acquire travel route information from the navigation system, the travel route information indicating a plurality of travel routes each extending from a current position of the vehicle to a destination and including a plurality of travel route sections;
      acquire an actual road surface gradient value of a road in each of the plurality of travel route sections from the navigation system;
      acquire a vehicle speed value of another vehicle that is traveling in each of the plurality of travel route sections;
      calculate the torque load value based on the acquired actual road surface gradient value and the acquired vehicle speed value by referring to the load information database, wherein the torque load value is calculated for each of the plurality of travel route sections;
      calculate a total torque load value for each of the plurality of travel routes based on the calculated torque load value for each of the plurality of travel route sections; and
      cause the display of the navigation system to display a torque load level for each of the plurality of travel routes based on the calculated total torque load value, wherein
   the processor controls an output-torque of the engine and/or the motor generator of the vehicle in accordance with operation of a user of the vehicle.

2. The travel route guidance system according to claim 1, further comprising a second server that stores traffic information of the plurality of travel routes, wherein the processor is further configured to
   acquire the traffic information from the second server, and
   calculate the vehicle speed value based on the traffic information.

3. The travel route guidance system according to claim 2, wherein the processor is further configured to
   determine whether a travel route section of the plurality of travels route sections is a congested section or a non-congested section based on the traffic information, and
   calculate the vehicle speed value in the congested section according to a degree of traffic congestion.

4. The travel route guidance system according to claim 3, wherein the processor is further configured to calculate the vehicle speed value in the non-congested section based on a change in time of a position of another vehicle traveling in the non-congested section.

5. The travel route guidance system according to claim 3, wherein the processor is further configured to calculate the vehicle speed value in the non-congested section based on a legal speed for the road in the non-congested section.

6. The travel route guidance system according to claim 1, wherein:
   a first travel route and a second travel route of the plurality of travel routes include a common via-point, wherein
   the first travel route includes a first travel route section and a second travel route section, and the second travel route includes a third travel route section and a fourth travel route section,
   the first travel route section and the third travel route section each extend from the current position to the common via-point, and
   the second travel route section and the fourth travel route section each extend from the common via-point to the destination; and
   the processor is further configured to
   calculate the torque load value for each of the first travel route section, the second travel route section, the third travel route section, and the fourth travel route section, and
   cause the display of the navigation system to display the torque load level for each of the first travel route section, the second travel route section, the third travel route section, and the fourth travel route section.

7. The travel route guidance system according to claim 1, wherein the processor is further configured to:
   acquire a curvature of a curve of the road in each of the plurality of travel route sections from the navigation system;
   calculate a difference in a rotational speed value of each of a set of drive wheels of the vehicle for each of the plurality of travel route sections based on the acquired curvature; and calculate the torque load value based on the acquired actual road surface gradient value, the acquired vehicle speed value, and the calculated difference in the rotational speed value.

8. The travel route guidance system according to claim 1, wherein the vehicle further includes an oil temperature sensor, and the processor is further configured to:

acquire a temperature value of a transmission oil of the transmission of the vehicle from the oil temperature sensor;

calculate a temperature increase amount of the transmission oil for each of the plurality of travel route sections based on the acquired actual road surface gradient value and the acquired vehicle speed value; and calculate the torque load value based on the acquired temperature value and the calculated temperature increase amount.

9. The travel route guidance system according to claim 1, wherein the processor is further configured to cause the display of the navigation system to further display an arrival time of the vehicle at the destination for each of the plurality of travel routes.

10. The travel route guidance system according to claim 3, wherein the processor is further configured to:

determine whether a value of the degree of traffic congestion is greater than a predetermined value, wherein the processor sets the vehicle speed value to a first vehicle speed value in a case where the value of the degree of traffic congestion is greater than the predetermined value, and sets the vehicle speed value to a second vehicle speed value in a case where the value of the degree of traffic congestion is equal to or less than the predetermined value, the second vehicle speed value being greater than the first vehicle speed value; and calculate the torque load value based on the acquired actual road surface gradient value and one of the first vehicle speed value or the second vehicle speed value by referring to the load information database.

11. The travel route guidance system according to claim 6, wherein the processor is further configured to cause the display of the navigation system to display an arrival time of the vehicle at the common via-point and at the destination for the first travel route section, the second travel route section, the third travel route section, and the fourth travel route section to prompt the user of the vehicle to select a travel route section from among the first travel route section, the second travel route section, the third travel route section, and the fourth travel route section based on the torque load level and the arrival time.

* * * * *